April 17, 1951     W. E. FRANKOWSKI     2,548,963
COMBINATION CALIPERS
Filed Nov. 4, 1949
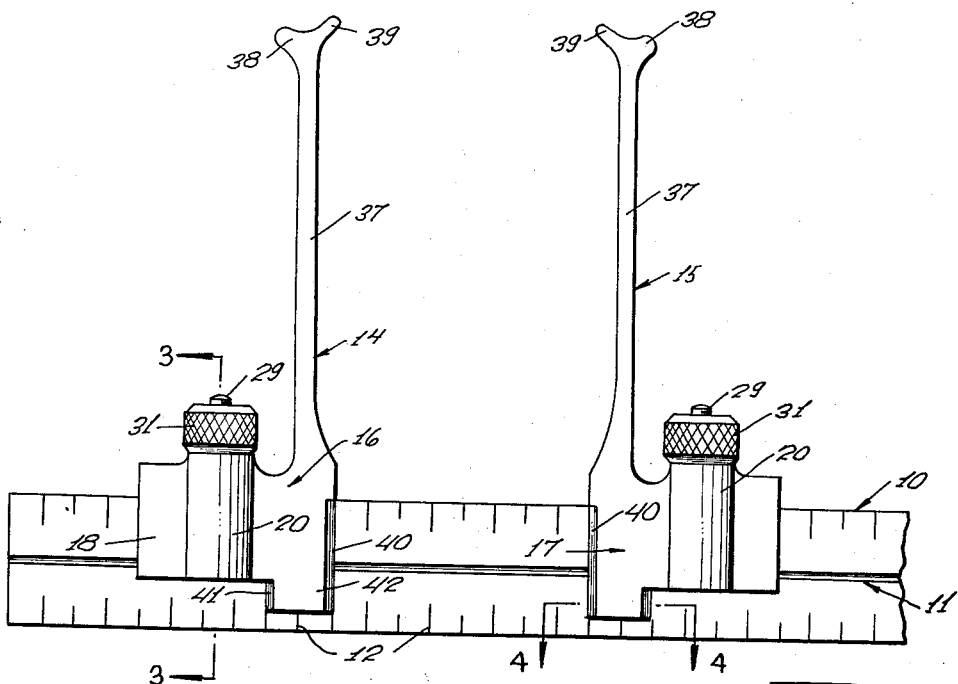
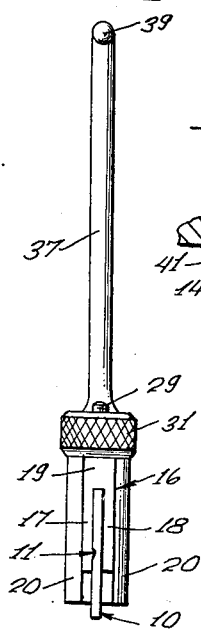
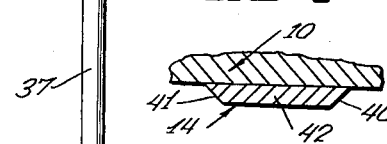
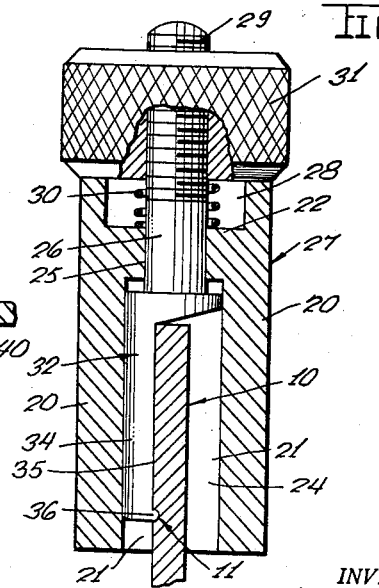
INVENTOR.
WALTER E. FRANKOWSKI
McMorrow, Berman & Davidson
ATTORNEYS Patented Apr. 17, 1951

2,548,963

UNITED STATES PATENT OFFICE 2,548,963

COMBINATION CALIPERS

Walter E. Frankowski, Huntington Park, Calif.

Application November 4, 1949, Serial No. 125,560

1 Claim. (Cl. 33—143)

This invention relates to a pair of calipers and more particularly to a pair of calipers for engagement on the scale used with combination squares, levels, and the like.

It is an object of this invention to provide a combination caliper of the kind to be more particularly described hereinafter, which is particularly formed for engagement on the scale of a bination square set having a longitudinally extending groove on one side thereof. Another object of this invention is to provide a pair of combination calipers having a provision for measuring the inner and outer surfaces of an article and having means for adjustably securing the calipers in a selected position along the length of the scale.

A further object of this invention is to provide a pair of combination calipers of this kind having an anvil formed for engagement with the inner or outer surface of an object to be measured and having an index on the supporting frame for each of the anvils whereby the selected inner or outer surface will be readily determined along the length of the supporting scale.

A still further object of this invention is to provide a pair of combination calipers of this kind which are readily suited for use on the conventional type of scale used in combination square sets and formed for exposing the indicia on the scale when measuring inner or outer lengths.

With the above and other objects in view, my invention consists in the novel combination arrangement and details of structure set forth in the specification and drawings, and then more particularly described in the appended claims.

In the drawings:

Figure 1 is a side elevation of a pair of calipers, constructed according to an embodiment of this invention engaged on a conventional scale of a combination square set.

Figure 2 is an end elevation of the square carrying the calipers.

Figure 3 is a fragmentary detailed section taken on the line 3—3 of Figure 1.

Figure 4 is a fragmentary longitudinal section taken on the line 4—4 of Figure 1.

Referring to the drawings, the numeral 10 designates generally the scale of a combination square set, conventionally used by machinists, mechanics, and other persons having use for combination squares and levels. The scale 10 is formed with a longitudinally extending groove 11 on one of the faces thereof for engagement with the clamping means generally carried by the square or level for securing the square or level in a selected position along the length of the scale. Indicia 12 are formed on one side surface of the scale 10 and extend along the length thereof.

A pair of calipers 14 and 15, formed according to an embodiment of this invention, are slideably engaged on the scale 10 for sliding movement along the length thereof for determining the length or diameter of articles to be measured. As both of the calipers 14 and 15 are formed in exactly the same manner, the detailed description of one of the calipers will suitably apply as a detailed description of the other.

The caliper 14 is formed with an upstanding caliper frame 16 which is bifurcated to form a pair of spaced apart depending arms 17 and 18 which are open at the lower end for receiving therebetween one edge of the scale 10. The frame 16 may be formed as a pair of spaced apart plates which define the arms 17 and 18 and an upper bight portion 19 connecting the arms together at their upper end.

Each of the arms 17 and 18 is formed, intermediate the length thereof, with an outwardly extending barrel segment 20. Each of the barrel segments 20 is formed with a downwardly opening segmental bore 21 which confronts the segmental bore of the barrel segment 20 on the cooperating frame plate 17 or 18. Each segmental bore 21, 21, defines a longitudinal groove formed on the inner surface of the arms 17 and 18. The grooves are in registry with each other and extend inwardly from the lower end of the arms 17 and 18 and terminate at a point adjacent to the other end of the arms. The barrel segments 20 may be fixed to the side plates 17 and 18 but preferably the barrel segments are formed integral with the side plates and the caliper frame. A transverse intermediate wall 22, intermediate the length of the barrel segments 20 connects the two barrel segments together and defines an inner wall for the bore 24 defined by the bore sections 21. The intermediate wall 22 is formed with a central aperture 25 through which the upstanding shank 26 of a bolt may be rotatably engaged. The upper end of the barrel 27, defined by the barrel segments 21, is formed with an upwardly opening recess 28 through which the upper threaded end 29 of the bolt 26 is engaged.

A coiled spring 30 is loosely engaged about the upper end of the shank 26, about the screw 29, and is held in place within the recess 28 by a nut member 31. The nut member 31 is threadably engaged on the nut 29 and is attached to bear against the upper end of the barrel 27, being constantly biased outwardly relative to the barrel by the spring 30.

A depending clamping member 32 is fixed to, or formed integrally with, the lower end of the bolt shank 26 and extends downwardly within and conformably engages one of the grooves or bore segments 21. The clamping member 32 is formed as a section, or fragmentary portion of a bolt having a cylindrical outer surface 34 rotatably engaging the inner cylindrical surface of the bore 24. The inner surface of the clamping member 32 is flat, noted by the numeral 35 in the drawings, and slideably engages one side of the scale 10. A transversely projecting lug 36 is formed on the lower end of the clamping member 32 and is adapted to be engaged in the groove 11 for securing the clamping element 32 and the caliper frame 16 at a selected position along the length of the scale.

An outwardly extending arm 37 is formed integral with the frame 16 and is adapted to be extended from one longitudinal edge of the scale 10. A pair of oppositely extending anvil members 38 and 39 are formed on the extreme outer end of the arm 37 to provide abutment members for engaging the surface on the work piece to be determined.

One end of the frame 16 is formed with a straight transverse end 40 defining an index in alignment with the extreme outer end of one of the anvil members, as the anvil member 39. A second index 41 is formed on a depending section 42 of the frame 16 and is spaced from the index 40 a distance equal to the space between the extreme transverse ends of the abutment members 38 and 39, and being in alignment with the extreme outer end of the other abutment member 38 forms an index therefor. In other words, the index 41 will determine the position of the anvil 39, in relation to the scale 10, while the index 41 will determine the position of the other anvil 38.

In the use and operation of the combination caliper described above, the nut elements 38 of the pair of calipers 14 and 15 are initially loosened on their respective bolts and the caliper frames 16 and 17 are engaged on the scale with the outside measuring anvils 39 in confronting relation and the inside measuring calipers 38 extending oppositely and outwardly from the supporting arms 37. The calipers 14 and 15 may then be moved along the length of the scale 10 until they engage the work piece to be measured and then the indices of the respective frames will indicate, along the length of the scale, the spaced apart distance of the respective anvils.

As the extreme lower edges of the depending arms 17 and 18 are spaced upwardly from the one longitudinal edge of the scale 10, all of the indices on the scale may be readily viewed in any and all positions of the calipers 14 and 15.

I claim:

An attachment for securing a caliper to an adjustable square having a groove between its longitudinal edges comprising an upstanding frame having a pair of spaced-apart arms depending from the lower end thereof and embracingly receiving the upper adjacent portion of said square, the inner surface of each of said arms being provided with a longitudinal groove extending inwardly from the lower end thereof and terminating at a point adjacent the upper end thereof, said grooves being in registry with each other, an upstanding bolt shank positioned adjacent the upper end of said frame and supported in said frame for sliding up-and-down movement, a clamping element extending longitudinally of and conformably engaging the groove of one of said arms and carried by the lower end of said bolt shank and selectively engageable with the upper end of said adjacent portion of said square, means projecting transversely of said clamping element adjacent to the lower end thereof and embracingly received within the groove of said square, there being a recess formed about said bolt shank in said other end of said upstanding frame, a spring circumposed about said bolt shank and received within said recess for normally biasing said bolt shank toward its upward position, and a nut threadedly supported on said bolt shank and in confronting and bearing engagement with said other end of said upstanding frame for effecting the sliding up-and-down movement of said bolt shank, the confronting end faces of said nut bridging said recess and providing an abutment for maintaining said spring in said recess.

WALTER E. FRANKOWSKI.

REFERENCES CITED

The following references are of record in the file of this patent:

UNITED STATES PATENTS

| Number | Name | Date |
|---|---|---|
| 869,578 | LeCompte | Oct. 29, 1907 |
| 1,007,400 | Speer | Oct. 31, 1911 |
| 1,383,217 | Konz | June 28, 1921 |
| 1,672,491 | Horak | June 5, 1928 |
| 2,199,235 | Ashel | Apr. 30, 1940 |

FOREIGN PATENTS

| Number | Country | Date |
|---|---|---|
| 170,029 | Germany | Apr. 23, 1906 |
| 378,767 | Great Britain | Aug. 18, 1932 |
| 609,741 | France | May 18, 1926 |